(12) United States Patent
Seo et al.

(10) Patent No.: US 9,983,445 B2
(45) Date of Patent: May 29, 2018

(54) LIQUID CRYSTAL LENS PANEL AND DISPLAY DEVICE INCLUDING LIQUID CRYSTAL LENS PANEL

(71) Applicant: SAMSUNG DISPLAY CO., LTD., Yongin-si, Gyeonggi-do (KR)

(72) Inventors: Hyun Seung Seo, Anyang-si (KR); Seung Jun Jeong, Hwaseong-si (KR); Jung-Hyun Cho, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 160 days.

(21) Appl. No.: 15/003,546

(22) Filed: Jan. 21, 2016

(65) Prior Publication Data

US 2016/0266447 A1  Sep. 15, 2016

(30) Foreign Application Priority Data

Mar. 10, 2015 (KR) .......................... 10-2015-0033308

(51) Int. Cl.
| | |
|---|---|
| G02F 1/133 | (2006.01) |
| G02F 1/1343 | (2006.01) |
| G02F 1/1339 | (2006.01) |
| G02B 27/22 | (2018.01) |
| G02F 1/29 | (2006.01) |

(52) U.S. Cl.
CPC ....... *G02F 1/134309* (2013.01); *G02B 27/22* (2013.01); *G02F 1/13394* (2013.01); *G02F 1/29* (2013.01)

(58) Field of Classification Search
None
See application file for complete search history.

(56) References Cited

U.S. PATENT DOCUMENTS

| 8,531,646 B2 | 9/2013 | Shi et al. | |
|---|---|---|---|
| 2013/0063691 A1* | 3/2013 | Takama | G02F 1/29 349/143 |

FOREIGN PATENT DOCUMENTS

| KR | 1020040034899 | 4/2004 |
|---|---|---|
| KR | 1020090041337 | 4/2009 |
| KR | 1020090065934 | 6/2009 |

* cited by examiner

*Primary Examiner* — Richard Kim
(74) *Attorney, Agent, or Firm* — F. Chau & Associates, LLC

(57) ABSTRACT

A display device includes a liquid crystal lens panel that includes a lower substrate, a upper substrate that faces the lower substrate, a lower lens electrode disposed on the lower substrate, an upper lens electrode disposed on the upper substrate, a liquid crystal layer and a spacer disposed between the lower substrate and the upper substrate, and an opening formed at a portion of the upper lens electrode which corresponds to the spacer, where the opening of the upper lens electrode and the spacer partially overlap.

19 Claims, 20 Drawing Sheets

LIQUID CRYSTAL LENS PANEL AND DISPLAY DEVICE INCLUDING LIQUID CRYSTAL LENS PANEL

CROSS-REFERENCE TO RELATED APPLICATION

This application claims priority from and the benefit of Korean Patent Application No. 10-2015-0033308 filed in the Korean Intellectual Property Office on Mar. 10, 2015, the contents of which are herein incorporated by reference in their entirety.

BACKGROUND (a) Technical Field

Embodiments of the present disclosure are directed to a liquid crystal lens and a display device including the same.

(b) Discussion of the Related Art

In general, a display device displays a 2D plane image. Recently, as demand for 3D stereoscopic images has increased in fields such as gaming and movies, a 3D stereoscopic image can be displayed using a display device.

A stereoscopic image display device divides a left-eye image and a right-eye image that have binocular disparity, and respectively provides them to a left eye and a right eye of a viewer. The viewer recognizes the left-eye image and the right-eye image through both eyes, and the images are combined in the brain such that stereoscopicity is perceived.

To create a stereoscopic image, a stereoscopic display device uses linearly polarizing stereoscopic glasses to divide the left-eye image and the right-eye image, however there is an inconvenience in that the glasses must be worn.

To resolve the inconvenience, an autostereoscopic method has been proposed that does not involve wearing glasses. An autostereoscopic method may be one of a lenticular type, a parallax type, an integral photography type, and a holography type, depending on a type of element used to divide the image for each direction, and recently, focus has been on a lenticular type of stereoscopic image display device.

A lens used in the lenticular type may be a convex lens or a Fresnel lens. A Fresnel lens is thinner than a convex lens. A Fresnel lens has a plurality of circular arcs on a surface thereof. The circular arcs of a Fresnel lens refract light.

Recently, a liquid crystal lens has been manufactured that can realize a lens by controlling director distribution of liquid crystals through an electric field. A liquid crystal lens includes an upper substrate, a lower substrate, and a thick liquid crystal layer between the upper substrate and the lower substrate. A liquid crystal lens includes a plurality of electrodes, and each electrode is supplied with a different voltage to control the liquid crystal directors.

In addition, to convert a plane image display method into a stereoscopic image display method, a 2D/3D compatible image display device has been developed, and a lens capable of switching between the 2D/3D image has been developed for this purpose.

SUMMARY

Embodiments of the present disclosure can provide a display device capable of displaying both a 2D image and a 3D image and ameliorating the texture of a liquid crystal lens.

An exemplary embodiment of the present disclosure provides a display device, including a liquid crystal lens panel that includes a lower substrate, an upper substrate that faces the lower substrate, a lower lens electrode disposed on the lower substrate, an upper lens electrode disposed on the upper substrate, a liquid crystal layer and a spacer disposed between the lower substrate and the upper substrate, and an opening disposed in a portion of the upper lens electrode which corresponds to the spacer. The opening of the upper lens electrode partially overlaps the spacer.

The opening may have a circular shape.

No electric field can be generated in a region of the liquid crystal layer that corresponds to the opening.

A plurality of spacers and openings may be disposed in the liquid crystal lens panel.

The lower lens electrode may include a plurality of branch electrodes that form a stripe pattern, and the upper lens electrode may be formed to have a plate shape.

Widths of the branch electrodes may be the same.

Widths of the branch electrodes may increase toward narrowed center of the liquid crystal lens panel.

The display device may further include a display panel configured to display an image. The display panel may be one of a liquid crystal display (LCD) panel, an electrophoretic display panel (EDP), an organic light emitting display (OLED) panel, or a plasma display panel (PDP).

The liquid crystal lens panel is configured to operate in a 2-dimensional (2D) display mode or a 3-dimensional (3D) display mode. The liquid crystal lens may apply no voltage to the upper lens electrode and the lower lens electrode in 2D mode, and the liquid crystal lens may apply different voltages to a plurality of branches of the lower lens electrode and a predetermined common voltage to the upper lens electrode in 3D mode.

Another exemplary embodiment of the present disclosure provides a display device, including a liquid crystal lens panel that includes a lower substrate, an upper substrate that faces the lower substrate, a lower lens electrode disposed on the lower substrate, an upper lens electrode disposed on the upper substrate, and a liquid crystal layer and a spacer disposed between the lower substrate and the upper substrate, and an opening formed in a portion of the upper lens electrode which corresponds to the spacer, wherein the liquid crystal lens panel forms a Fresnel lens due to application of voltages to the lower lens electrode and the upper lens electrode.

The opening of the upper lens electrode and the spacer may partially overlap.

The opening may have a circular shape.

No electric field can be generated in a region of the liquid crystal layer that corresponds to the opening.

The liquid crystal lens panel may include a plurality of spacers and openings disposed therein.

The lower lens electrode may include a plurality of branch electrodes that form a stripe pattern, and the upper lens electrode may have a plate shape.

Widths of the branch electrodes may be the same.

Widths of the branch electrodes may increase toward a center of liquid crystal lens panel.

The display device may further include a display panel configured to display an image, wherein the display panel is one of a liquid crystal display (LCD) panel, an electrophoretic display panel (EDP), an organic light emitting display (OLED) panel, or a plasma display panel (PDP).

The liquid crystal lens panel may be configured to operate in a 2-dimensional (2D) display mode or a 3-dimensional (3D) display mode. The liquid crystal lens panel applies no voltage to the upper lens electrode and the lower lens electrode in 2D display mode, and the liquid crystal lens applies different voltages to a plurality of branches of the lower lens electrode and a predetermined common voltage to the upper lens electrode in 3D display mode.

A display device according to an exemplary embodiment of the present disclosure can display both a 2D image and a 3D image according to an on/off state of the liquid crystal lens by disposing the liquid crystal lens on the display panel.

Further, a display device according to an exemplary embodiment of the present disclosure can suppress texture generation caused by the spacer formed in the liquid crystal lens by forming an opening in the upper common electrode of the liquid crystal lens.

BRIEF DESCRIPTION OF THE DRAWINGS

FIG. 9, FIG. 11, and FIG. 13 are front views of the liquid crystal lens, and FIG. 10, FIG. 12, FIG. 14 are side views of the liquid crystal lens illustrated in FIG. 9, FIG. 11, and FIG. 13.

DETAILED DESCRIPTION OF EXEMPLARY EMBODIMENTS

Figure 1:
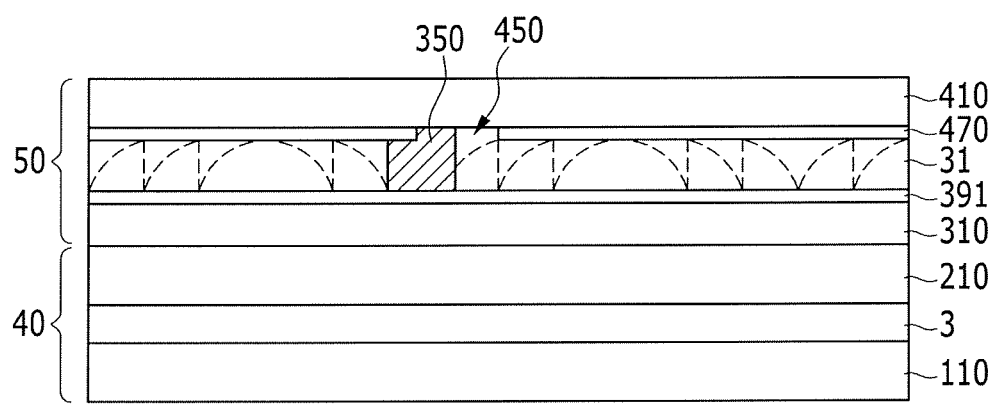
FIG. 1 illustrates a display device according to an exemplary embodiment of the present disclosure.

Embodiments of the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

A liquid crystal lens and a display device according to an exemplary embodiment of the present disclosure will now be described in detail with reference to FIG. 1 and FIG. 2.

First, a display device according to an exemplary embodiment of the present disclosure will be described with reference to FIG. 1 and FIG. 2. FIG. 1 illustrates a display device according to an exemplary embodiment of the present disclosure.

Referring to FIG. 1, a display device according to according to an exemplary embodiment of the present disclosure includes a display panel 40 and a liquid crystal lens panel 50 positioned on the display panel.

The display panel 40 may be one of various display panels, such as a liquid crystal display (LCD) panel, an electrophoretic display panel (EDP), an organic light emitting display (OLED) panel, or a plasma display panel (PDP). In a present exemplary embodiment, as an example of the display panel 40, a liquid crystal display panel will be described.

The display panel 40 includes a first substrate 110 and a second substrate 210 disposed to face each other, and a liquid crystal layer 3 disposed between the substrates. Liquid crystal molecules align according to a potential applied to electrodes disposed at the first substrate 110 and the second substrate 210, thereby displaying images.

The first substrate 110 includes a plurality of pixel areas. In each pixel area is disposed a gate line extending in a first direction, a data line extending in a second direction intersecting the first direction and insulated from the gate line, and a pixel electrode. Further, in each pixel, a thin film transistor is disposed to be electrically connected to the gate line and the data line, and to be electrically connected to the corresponding pixel electrode. The thin film transistor provides a driving signal to the corresponding pixel electrode. Further, a driver integrated circuit (IC) may be disposed at one side of the first substrate. The driver IC receives various external signals, and outputs to the thin film transistor a driving signal that drives the display panel 40 in response to various input control signals.

The second substrate 210 may include red, green, and blue (RGB) color filters on one surface to realize predetermined colors from light provided from a backlight unit, and a common electrode disposed on the RGB color filters to face the pixel electrode. Here, the RGB color filters may be formed through a thin film process. In a present embodiment, the color filters are disposed on the second substrate, but embodiments are not limited thereto. For example, the color filters may be disposed on the first substrate. Further, the common electrode of the second substrate may be disposed on the first substrate.

The molecules of liquid crystal layer 3 are oriented by the voltage applied to the pixel electrode and the common electrode, which changes the transmittance of the light provided from the backlight unit, thereby displaying an image through the display panel 40. If there is no backlight unit, the transmittance of the light incident to and reflected from the front surface of the display panel is controlled, thereby displaying an image.

The liquid crystal lens panel 50 is positioned on the display panel 40. The liquid crystal lens panel 50 includes a lower substrate 310, an upper substrate 410 disposed to face the lower substrate, and a liquid crystal layer 31 interposed between the lower substrate and the upper substrate.

Referring to FIG. 1, a lower lens electrode 391 is disposed within the lower substrate 310, and an upper lens electrode 470 is disposed within the upper substrate.

A spacer 350 is disposed between the lower substrate 310 and the upper substrate 410, and an opening 450 is formed in the upper lens electrode 470 that partially overlaps the spacer 350.

A liquid crystal lens according to an exemplary embodiment of the present disclosure can eliminate texture artifacts generated in the liquid crystal lens by the spacer 350 of the liquid crystal lens by forming the opening 450 in the upper lens electrode 470 to correspond to the position at which the spacer 350 is disposed.

The structure and effect of a liquid crystal lens according to an exemplary embodiment of the present disclosure will be described with reference to FIG. 2A to FIG. 3.

Figure 2A:
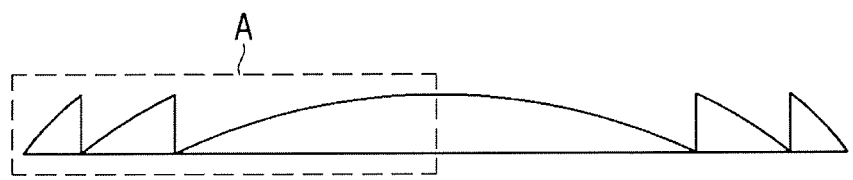
FIG. 2A illustrates a structure of a general Fresnel lens.
Figure 2B:
FIG. 2B is an enlarged view of a portion indicated by a dotted line in FIG. 2A.
Figure 2C:
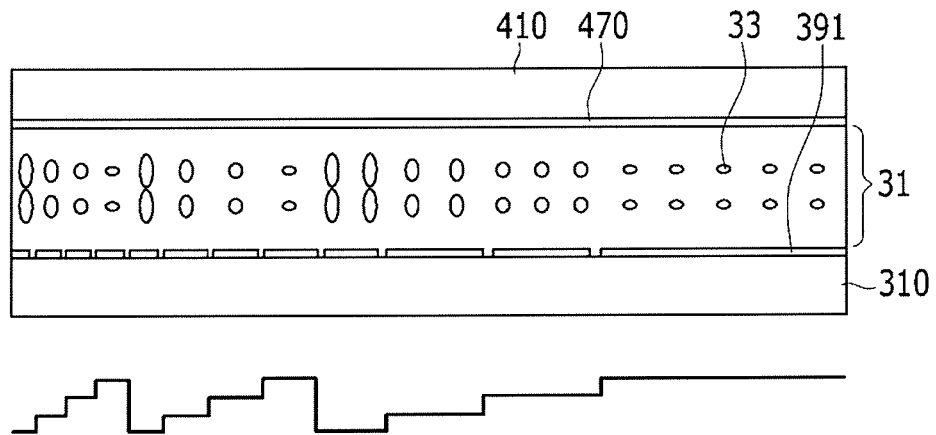
FIG. 2C illustrates a liquid crystal lens according to an exemplary embodiment of the present disclosure.

FIG. 2A illustrates a structure of a general Fresnel lens, and FIG. 2B is an enlarged view of the portion indicated by a dotted line in FIG. 2A. Straight lines forming a step shape shown in FIG. 2B show a zone plate phase distribution. FIG. 2C illustrates a liquid crystal lens according to an exemplary embodiment of the present disclosure.

In the present disclosure, the lens electrode of the liquid crystal lens includes a lower lens electrode 391 made of a plurality of separate electrodes and an upper lens electrode 470 facing the lower lens electrode. The upper lens electrode may be a plate, and the upper lens electrode and the lower lens electrode are transparent.

Figure 3:
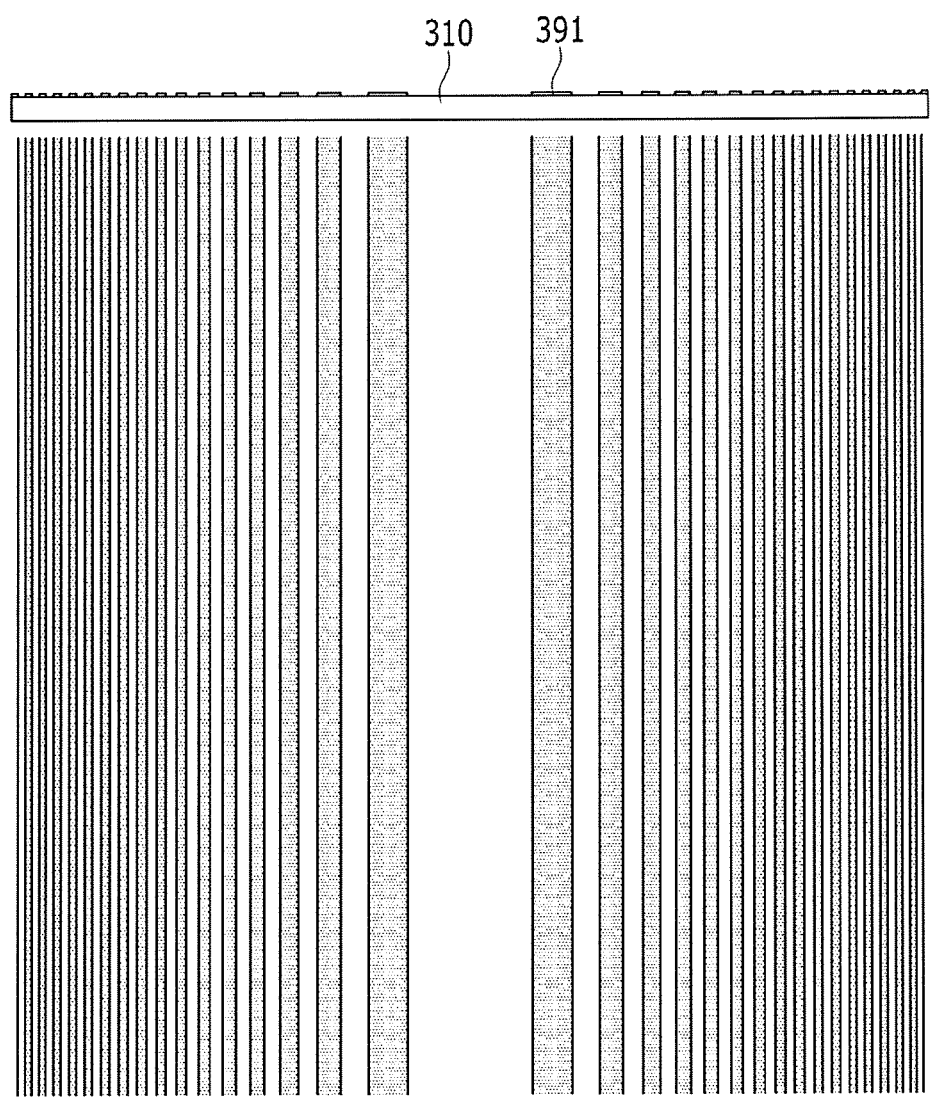
FIG. 3 is a cross-sectional view and a layout view of a lower lens electrode of a liquid crystal lens according to an exemplary embodiment of the present disclosure.

FIG. 3 is a cross-sectional view and a layout view of a lower lens electrode of a liquid crystal lens according to an exemplary embodiment of the present disclosure. In the lower lens electrode 391, a plurality of branch electrodes, hereinafter referred to as first lens electrodes and second lens electrodes, are disposed in stripe patterns, in which one stripe pattern forms one unit lens electrode. That is, FIG. 3 shows one unit lens electrode.

Referring to FIG. 3, a width of the separate lens electrodes of one unit lens increases closer to a center thereof. This unit lens functions as a zone plate of the liquid crystal lens. The zone plate may be referred to as a Fresnel zone plate, and functions as a lens by through diffraction. A liquid crystal lens of a display device of the present disclosure functions as a Fresnel lens since a plurality of separate electrodes are supplied with different voltages, a common voltage is applied to the upper lens electrode, and the alignment of the liquid crystal molecules changes as a function of the position of the lens electrodes.

However, the lower lens electrode 391 may have a stripe pattern in which a plurality of branch electrodes are separated by a same distance.

As shown in FIG. 2C, a liquid crystal lens according to an exemplary embodiment of the present disclosure includes the lower substrate 310, the upper substrate 410 facing the lower substrate, and the liquid crystal layer 31 interposed between the lower substrate 310 and the upper substrate 410.

The lower lens electrode 391 may include a transparent conductive oxide. For example, the lower lens electrode 391 may include indium tin oxide (ITO) or indium zinc oxide (IZO). In addition, the lower lens electrode 391 may be connected to a driving IC disposed at one side and may receive a voltage when the liquid crystal lens is turned on.

Furthermore, an insulating layer may be disposed at a lower portion of the lower lens electrode 391. This insulating layer may include an insulating material that transmits light. For example, the insulating layer may include silicon nitride (SiNx) or silicon oxide (SiOx).

An alignment layer may be disposed on the lower lens electrode 391.

The upper lens electrode 470 is disposed on the upper substrate 410. The upper lens electrode 470 may include a transparent conductive oxide material. For example, the upper lens electrode 470 may include indium tin oxide (ITO) or indium zinc oxide (IZO).

In addition, a passivation layer, an alignment layer, etc., may be disposed on the upper lens electrode 470.

When a voltage is supplied to the upper lens electrode 470 and the lower lens electrode 391, liquid crystal molecules 33 of the liquid crystal layer 31 may re-arrange. Accordingly, the lower lens electrode 391, the upper lens electrode 470, and the liquid crystal layer 31 constitute a unit lens.

The liquid crystal layer 31 may have a thickness of about 2 μm to 5 μm. The liquid crystal layer 31 is sufficiently thin to realize high speed switching according to the alignment of the liquid crystal molecules. The liquid crystal layer 31 may aligned by the lower lens electrode 391 and the upper lens electrode 470 to have refractive properties of a Fresnel lens.

If a driving voltage is applied to the liquid crystal lens, a potential is generated between the lower lens electrode 391 and the upper lens electrode 470, which rearranges liquid crystal molecules 33 of the liquid crystal layer 31 interposed between the lower lens electrode 391 and the upper lens electrode 470. Accordingly, a unit lens may have the same phase differences as a Fresnel lens. Accordingly, when a liquid crystal lens is disposed on a display panel, a 3D stereoscopic image may be displayed without use of glasses.

When no voltage is applied to a liquid crystal lens according to an exemplary embodiment of the present disclosure, the liquid crystal molecules 33 of the liquid crystal layer 31 of the liquid crystal lens are not aligned, thereby displaying a 2D image. However, when a voltage is applied to the liquid crystal lens, the liquid crystal molecules 33 of the liquid crystal layer 31 of the liquid crystal lens align, thereby displaying a 3D stereoscopic image. As a result, when a liquid crystal lens according to an exemplary embodiment of the present disclosure is disposed on a display device, both a 2D image and a 3D image may be freely displayed.

In addition, the spacer 350 is disposed between the lower substrate 310 and the upper substrate 410 of a liquid crystal lens according to an exemplary embodiment of the present disclosure, and the opening 450 is formed in the upper lens electrode 470 that partially overlaps the spacer 350.

A liquid crystal lens according to an exemplary embodiment of the present disclosure can eliminate texture artifacts generated in a liquid crystal lens by the spacer 350 by forming the opening 450 in the upper lens electrode 470 to correspond to the position where the spacer 350 is formed.

Hereinafter, a structure of a liquid crystal lens of a display device according to an exemplary embodiment of the present disclosure will be described in detail with reference to FIG. 4 to FIG. 6.

Figure 4:
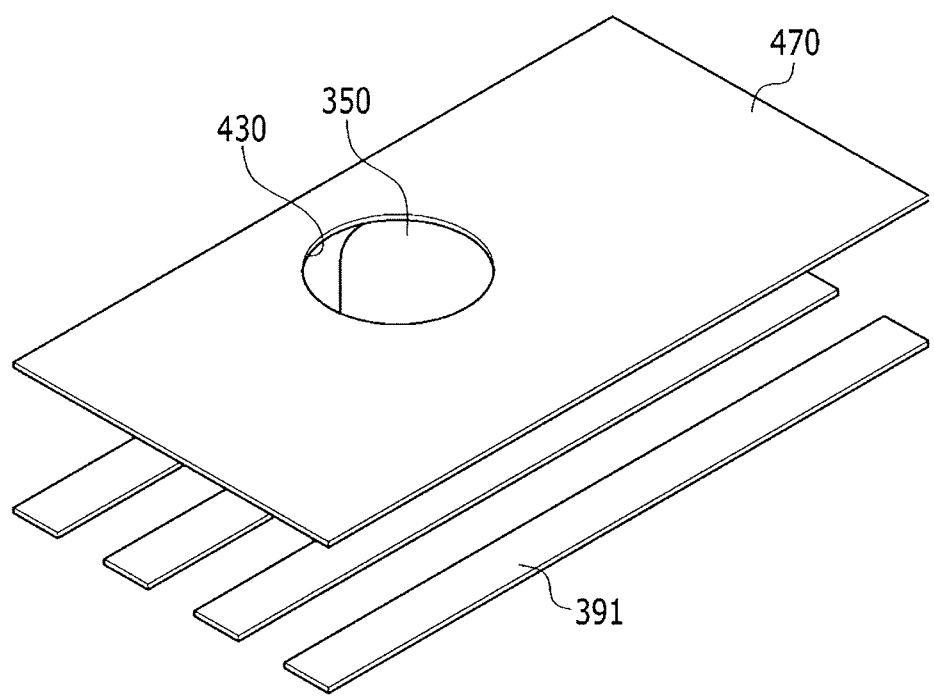
FIG. 4 stereoscopically illustrates a liquid crystal lens according to an exemplary embodiment of the present disclosure.

FIG. 4 stereoscopically illustrates a liquid crystal lens according to an exemplary embodiment of the present disclosure. FIG. 5 separately illustrates an upper lens electrode and a lower lens electrode of a liquid crystal lens according to an exemplary embodiment of the present disclosure. FIG. 6 is a cross-sectional view of a liquid crystal lens taken along a line VI-VI of FIG. 5.

Referring to FIG. 4, a liquid crystal lens according to an exemplary embodiment of the present disclosure includes lower lens electrodes 391 disposed in a stripe pattern, an upper lens electrode 470 disposed to face the lower lens electrodes, and a column spacer 350 formed between the lower lens electrodes and the upper lens electrode.

Referring to FIG. 4, an opening 450 is formed at a portion of the upper lens electrode 470 which partially overlaps the spacer 350. In FIG. 4, the opening 450 is illustrated as having a circular shape, but embodiments of the present disclosure are not limited thereto.

The position at which the spacer 350 is formed and the position at which the opening 450 is formed are not the same. In other words, the position at which the spacer 350 is formed and the position at which the opening 450 is formed partially overlap, but do not completely overlap.

Figure 5:
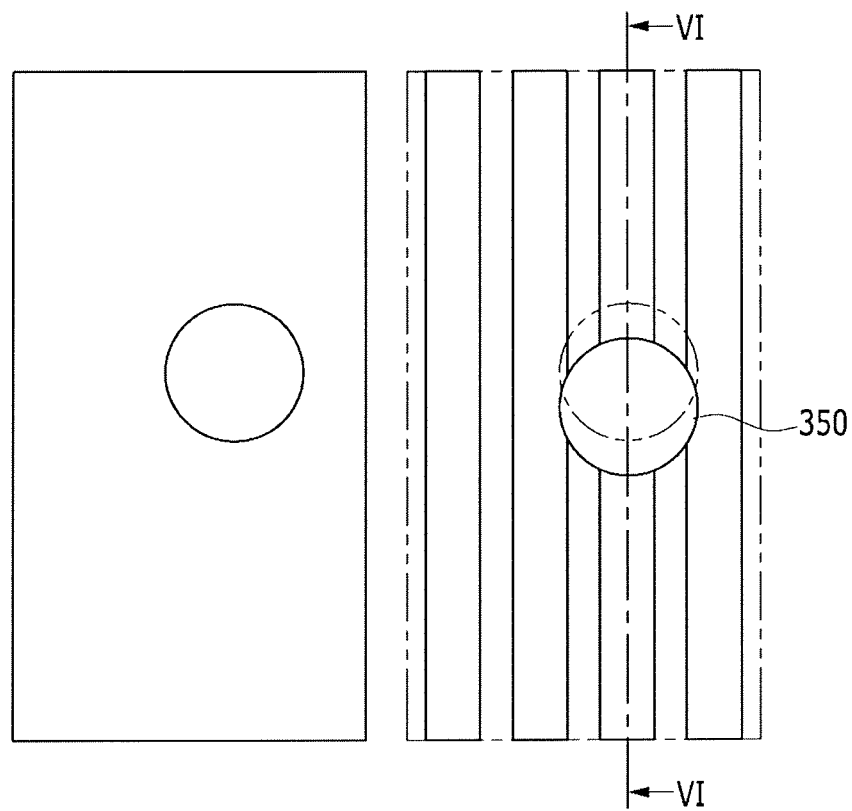
FIG. 5 separately illustrates an upper lens electrode and a lower lens electrode of a liquid crystal lens according to an exemplary embodiment of the present disclosure.

Referring to FIG. 5, the opening 450 may partially overlap the portion where the spacer 350 is formed.

As a result, one part of the opening 450 is blocked by the spacer 350, but another part of the opening 450 exposes the upper substrate 410 without being blocked by the spacer 350.

Figure 6:
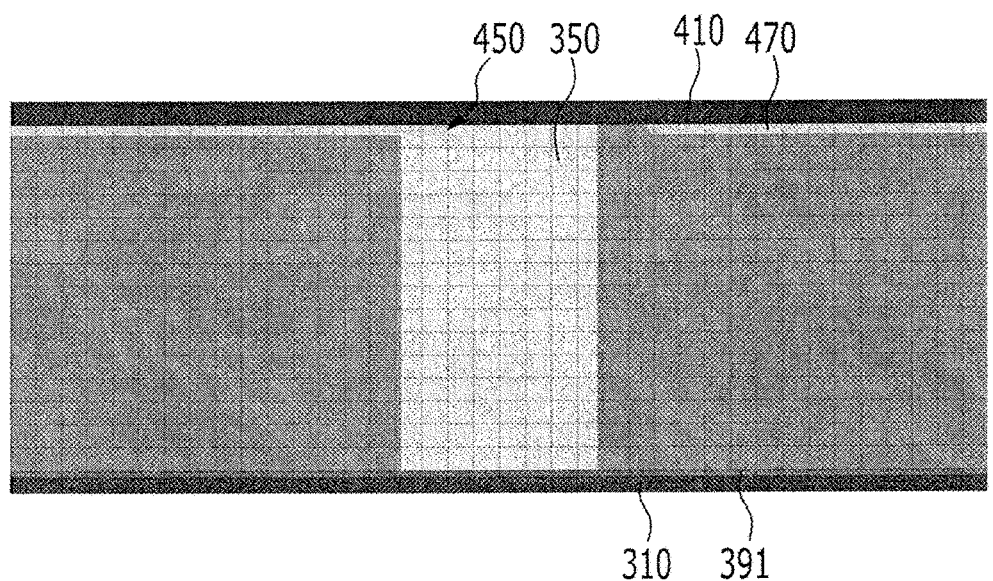
FIG. 6 is a cross-sectional view of a liquid crystal lens taken along a line VI-VI of FIG. 5.

FIG. 6 is a cross-sectional view of a liquid crystal lens taken along a line VI-VI of FIG. 5. Referring to FIG. 6, the lower lens electrode 391 is disposed on the lower substrate 310, and the upper lens electrode 470 is disposed on the upper substrate 410. The spacer 350 is disposed between the lower lens electrode 391 and the upper lens electrode 470.

The opening 450 is formed in the upper lens electrode 470, and although the opening 450 and the spacer 350 partially overlap, the central position of the opening 450 and the central position of the spacer 350 are not the same.

As a result, one part of the opening 450 is blocked by the spacer 350, and another part of the opening 450 is exposed.

That is, a portion of the upper substrate 410 without the upper lens electrode 470 disposed thereon is exposed.

A liquid crystal lens having this structure, that of the opening 450 formed at a position adjacent to the spacer 350, can suppress the breakage of an arrangement of the liquid crystal molecules in the liquid crystal layer of the liquid crystal lens breakage due to the spacer 350, and suppress the progress of the breakage.

The effect of a liquid crystal lens according to an exemplary embodiment of the present disclosure will be described with reference to FIG. 7A to FIG. 17.

Figure 7A:
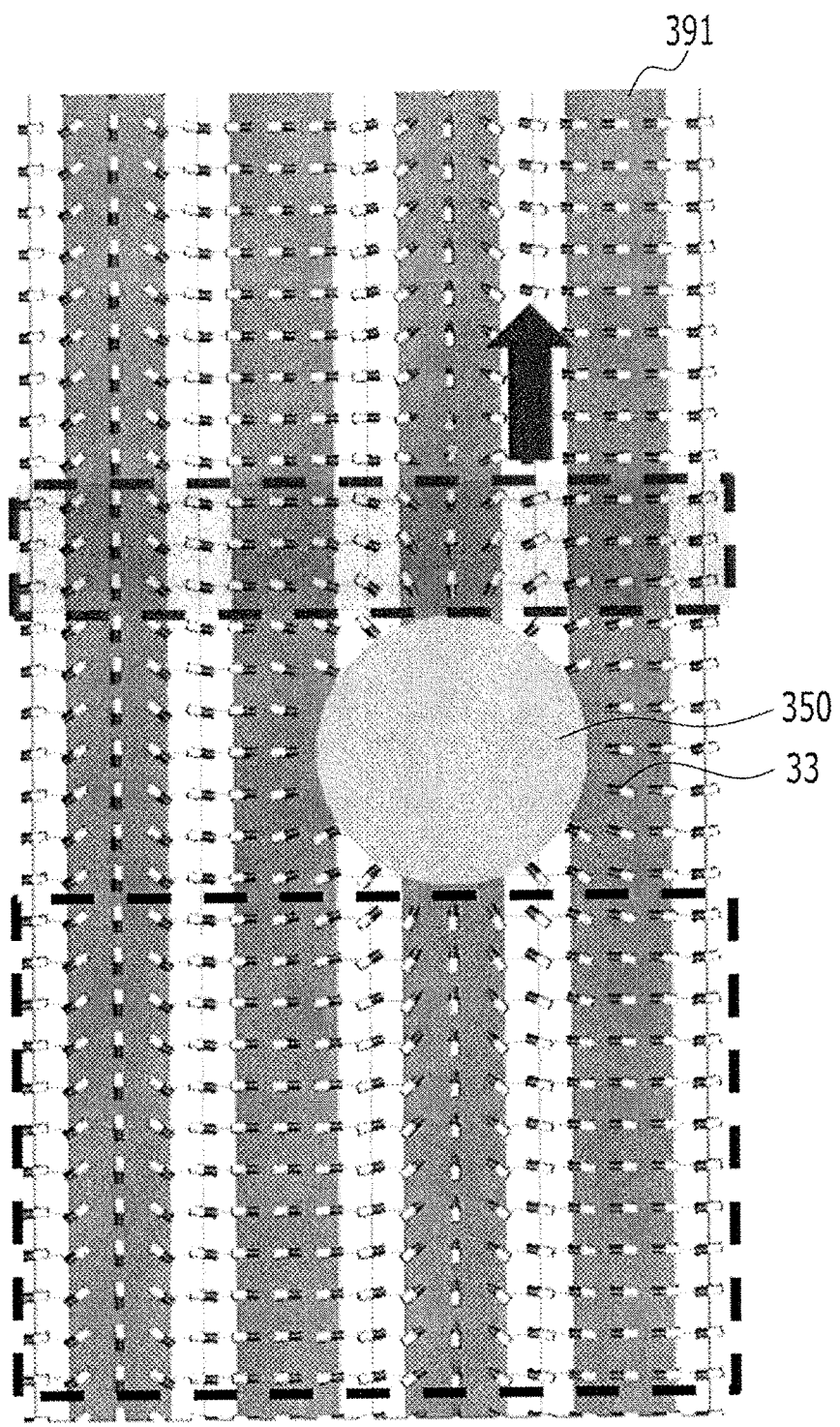
FIG. 7A and FIG. 7B illustrate a liquid crystal alignment of a liquid crystal lens according to a comparative embodiment of the present disclosure.
Figure 7B:
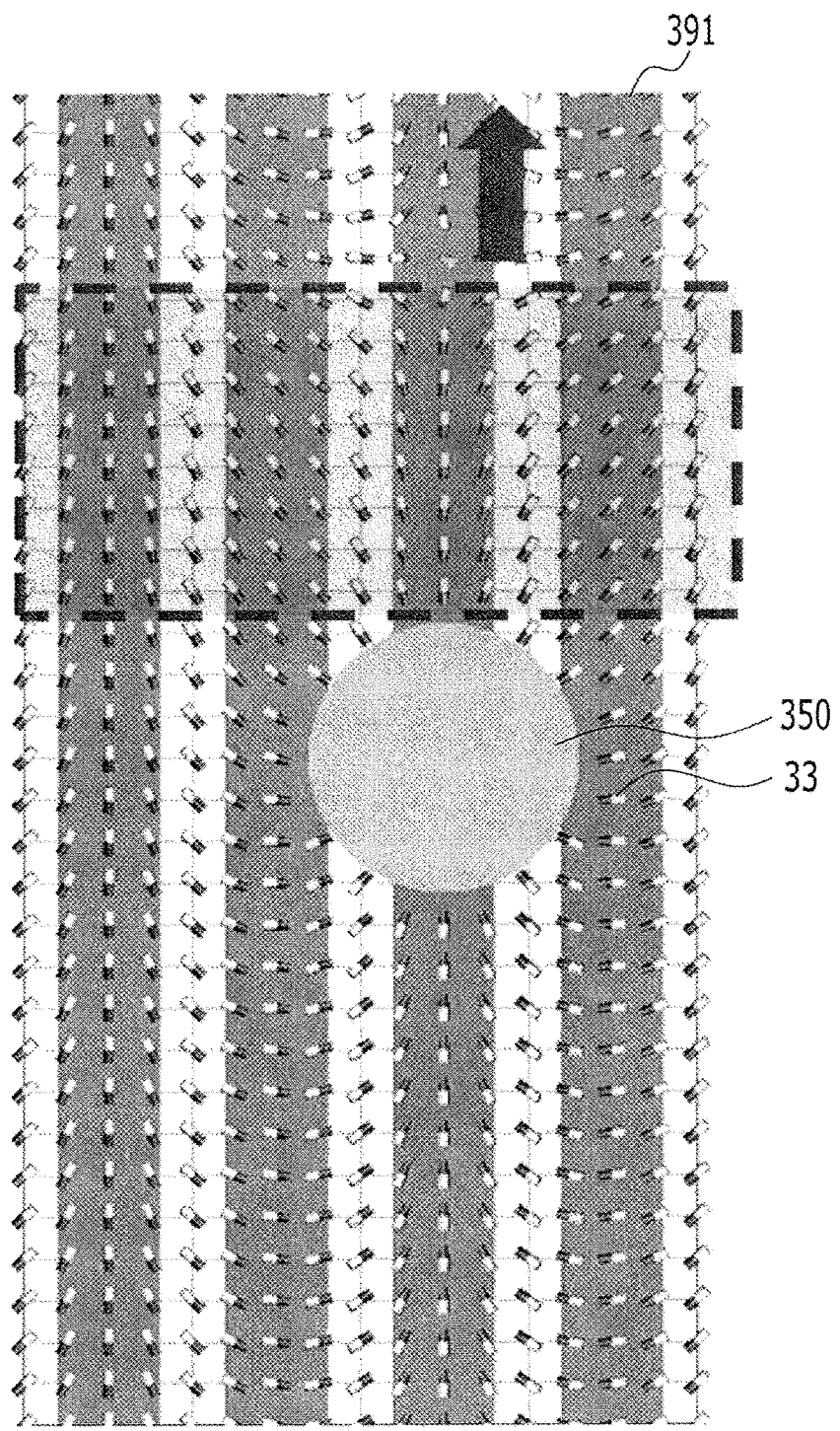

FIG. 7A and FIG. 7B illustrate a liquid crystal alignment of a liquid crystal lens according to a comparative embodiment of the present disclosure. Referring to FIG. 7A and FIG. 7B, no opening is formed near the spacer 350 in a liquid crystal lens according to the comparative embodiment of the present disclosure.

Referring to FIG. 7A, the arrangement of the liquid crystal molecules 33 positioned near the spacer 350 are disturbed with respect to their surrounding region due to the spacer 350. These regions in which the arrangement of the liquid crystal molecules is disturbed are indicated by rectangular boxes.

FIG. 7A illustrates the liquid crystal molecules immediately after being arranged, and FIG. 7B illustrates the liquid crystal arrangement after a period of time. Referring to FIG. 7A, the arrangement of the liquid crystal molecules is first seen to be disturbed in a region near the spacer 350, and the arrangement of the liquid crystal molecules is disturbed over time. Referring to FIG. 7B, the arrangement of the liquid crystal molecules is seen to be disturbed in a wider region.

When the arrangement of the liquid crystal molecules is disturbed, an arrangement of adjacent liquid crystal molecules is also disturbed. Accordingly, the breakage of the arrangement of the liquid crystal molecules caused by the spacer 350 propagates, thereby widening the breakage region. As a result, the breakage region of the liquid crystal molecules is visible as a texture, which can reduce performance of a liquid crystal lens.

Figure 8:
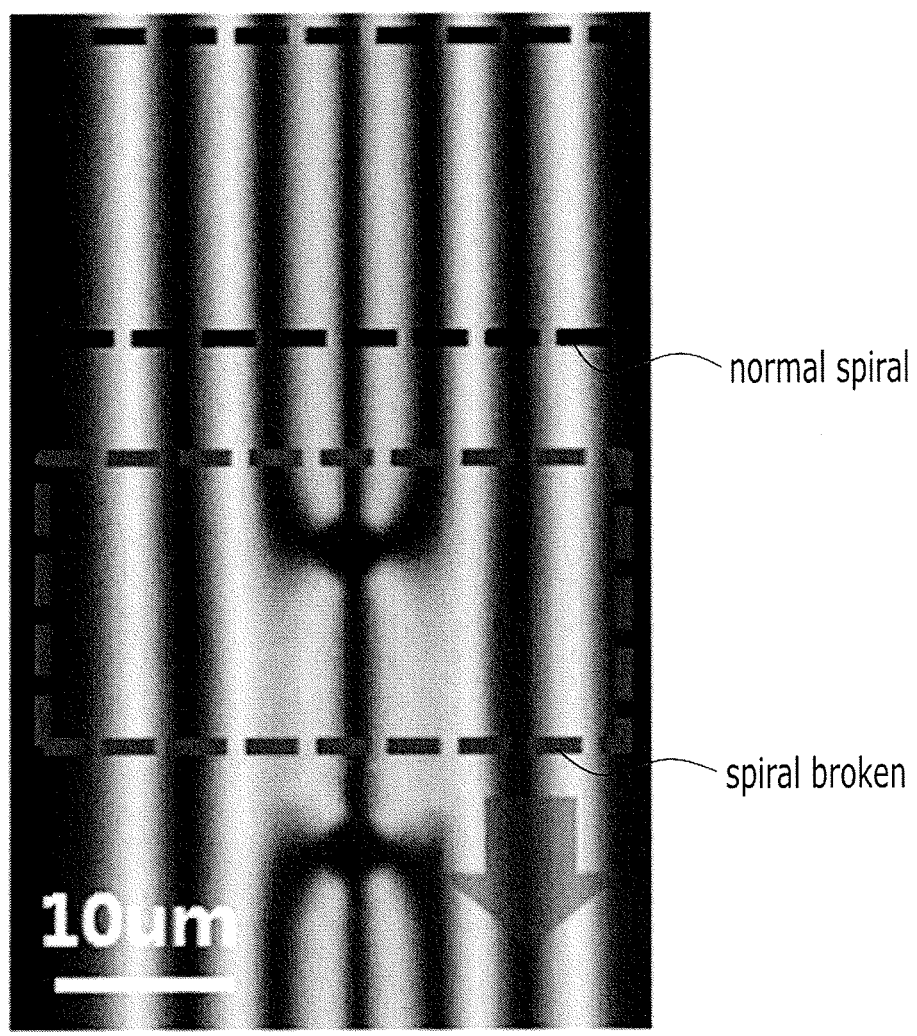
FIG. 8 illustrates how an arrangement of liquid crystal molecules positioned around a spacer changes in a liquid crystal lens.

FIG. 8 illustrates how an arrangement of liquid crystal molecules positioned around a spacer changes in a liquid crystal lens. Referring to FIG. 8, a spiral arrangement of the liquid crystal molecules is broken in a region where a spacer is formed, and the arrangement differs from that of the peripheral region.

Similar to FIG. 7A and FIG. 7B, this spiral arrangement breakage expands to an adjacent region, which is visible as a texture.

However, a liquid crystal lens according to an exemplary embodiment of the present disclosure can eliminate this artifact by forming an opening in the upper lens electrode around the region where the spacer is disposed.

FIG. 9 to FIG. 14 illustrate an arrangement of liquid crystal molecules according to time in a liquid crystal lens according to an exemplary embodiment of the present disclosure.

Figure 9:
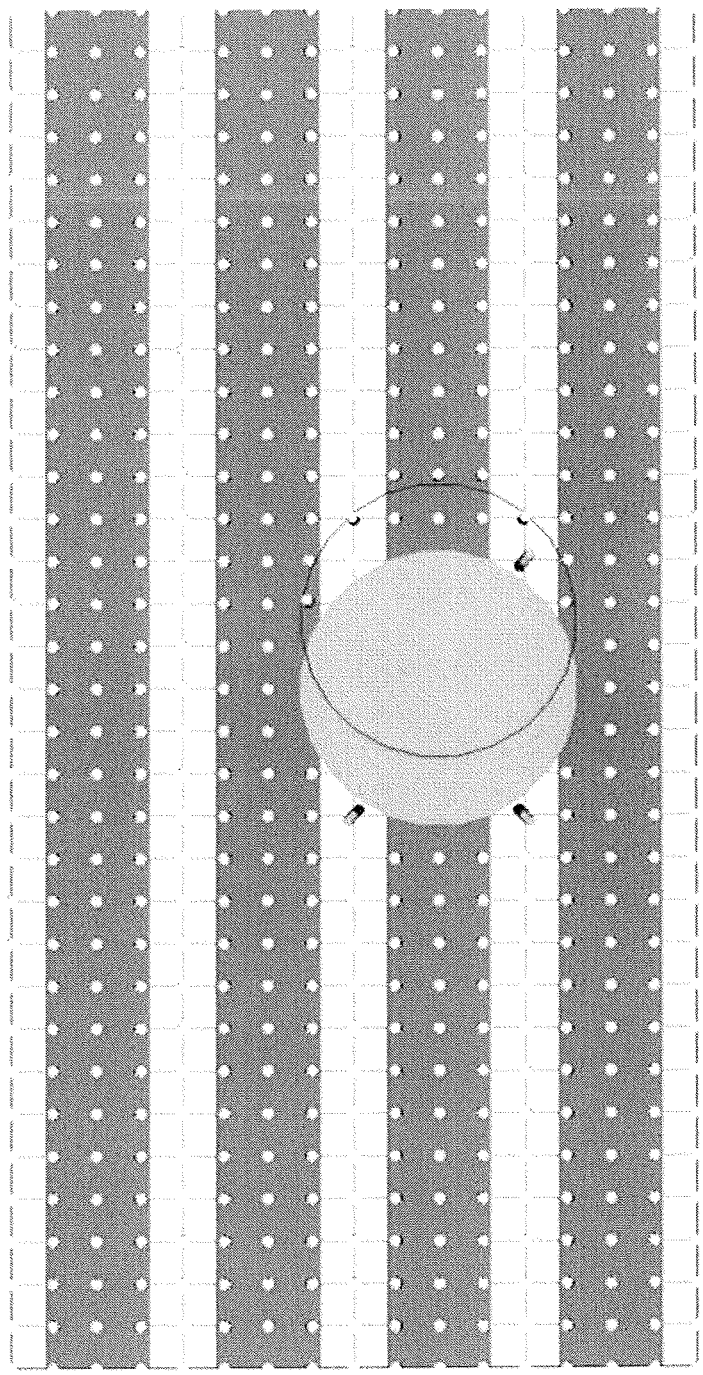
FIG. 9 to FIG. 14 illustrate an arrangement of liquid crystal molecules according to time in a liquid crystal lens according to an exemplary embodiment of the present disclosure, and specifically
Figure 10:
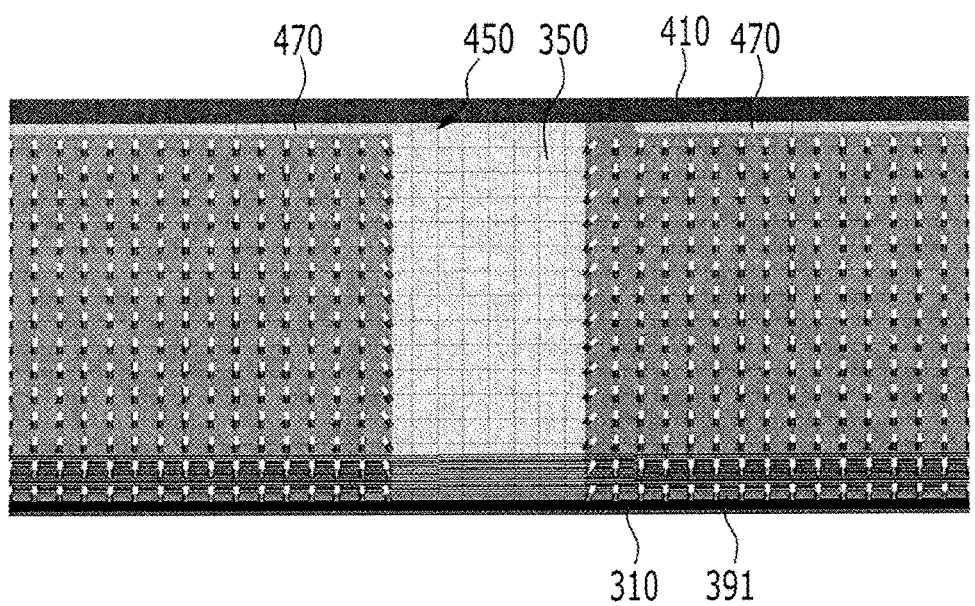
Figure 11:
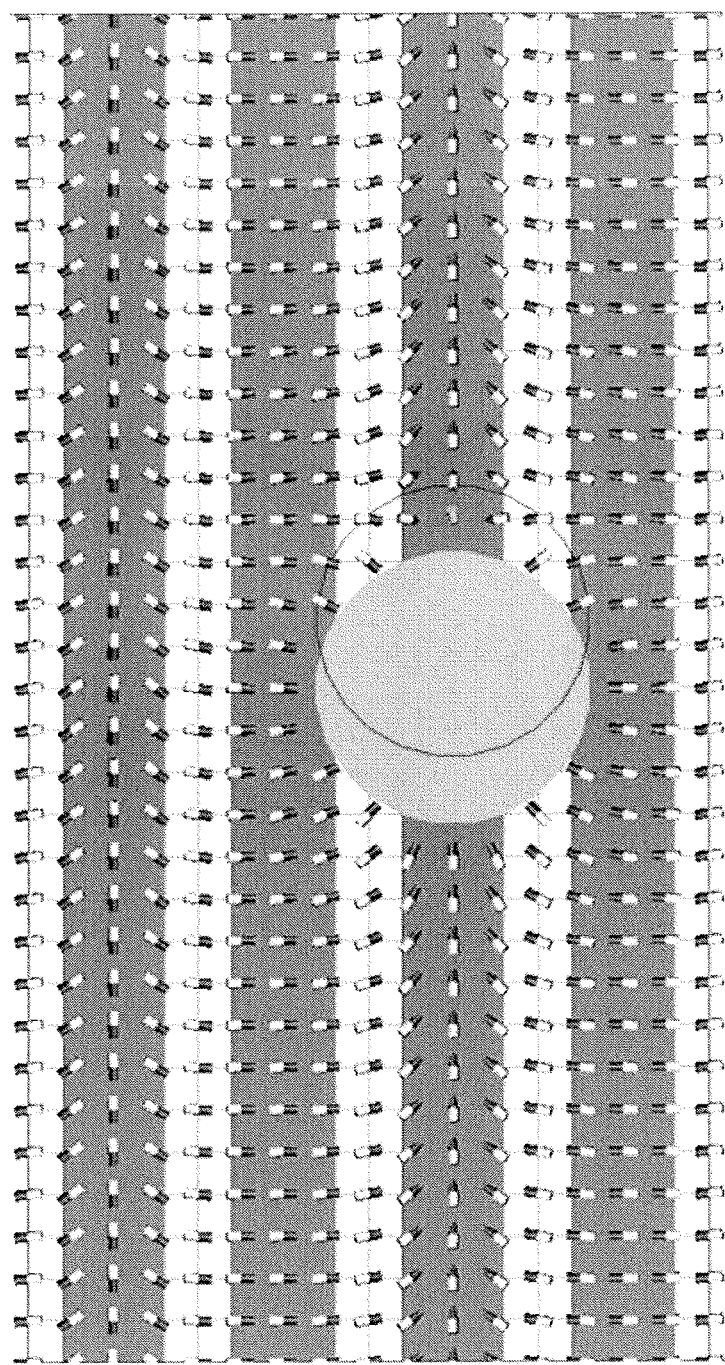
Figure 12:
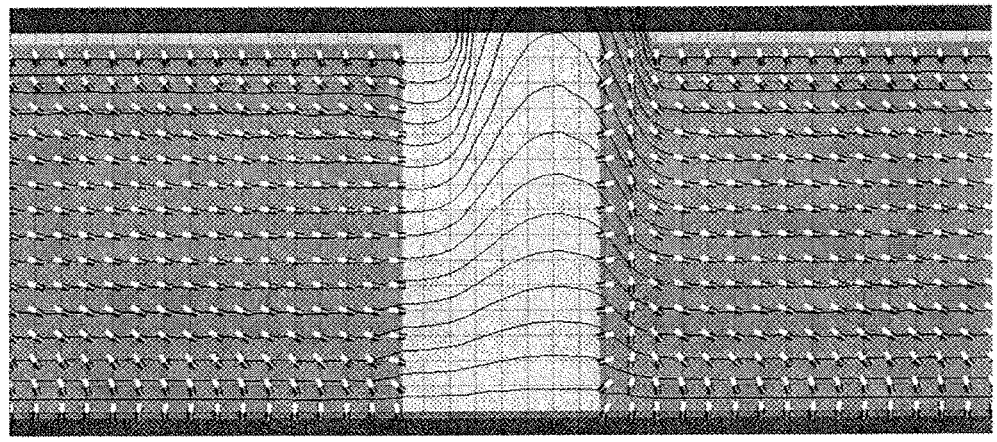
Figure 13:
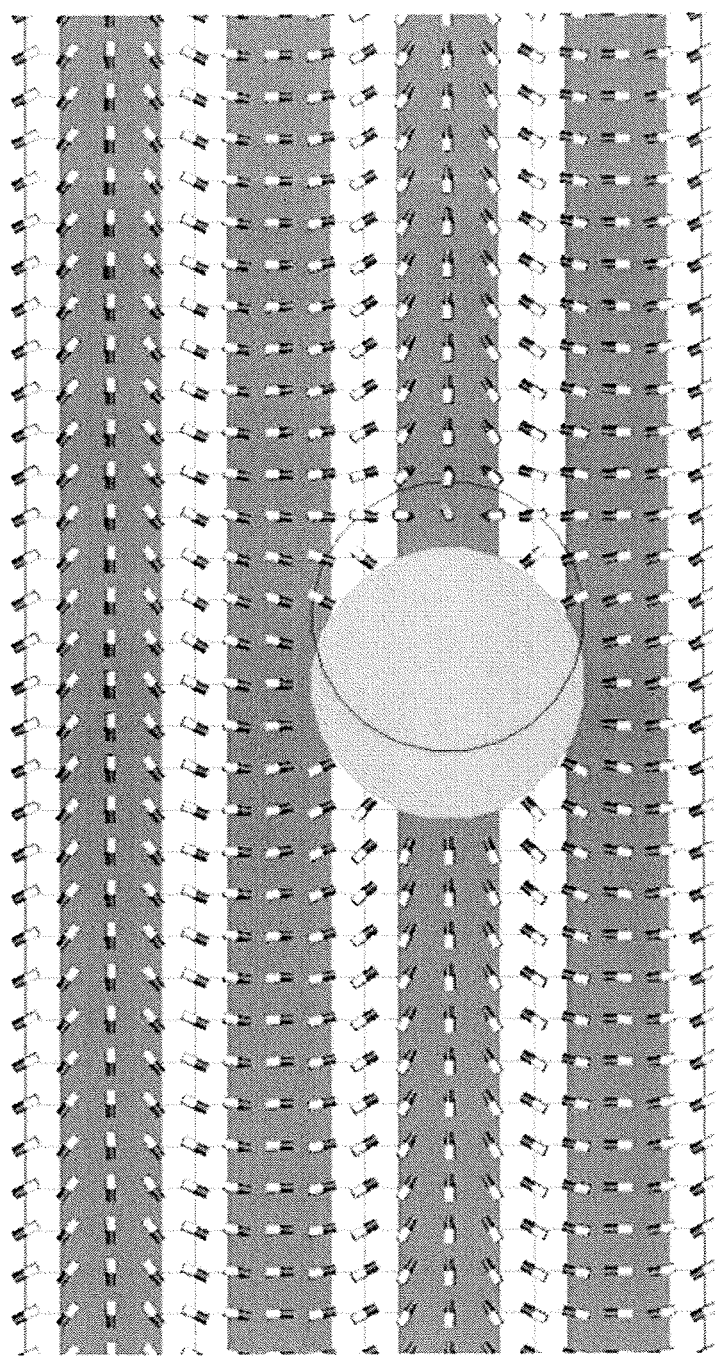
Figure 14:
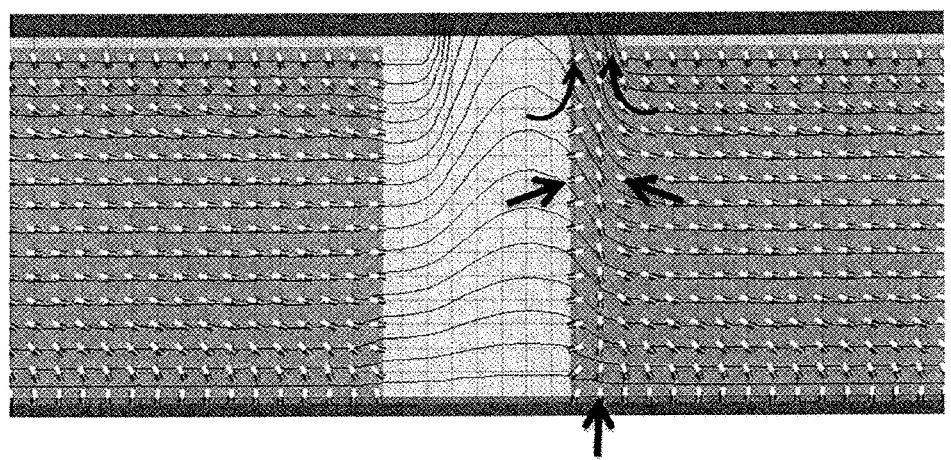

FIG. 9, FIG. 11, and FIG. 13 are front views of the liquid crystal lens, and FIG. 10, FIG. 12, FIG. 14 are side views of the liquid crystal lens illustrated in FIG. 9, FIG. 11, and FIG. 13.

FIG. 9 and FIG. 10 illustrate an arrangement of liquid crystal molecules before an electric field is applied to lens electrodes. Referring to FIG. 9 and FIG. 10, the liquid crystal molecules are aligned in a direction since no electric field is applied to the lower lens electrode and the upper lens electrode.

However, the liquid crystal molecules 33 align toward the spacer 350 due to the influence of the surface of the spacer 350. In other words, the liquid crystal molecules 33 positioned around the spacer 350 align to face the spacer 350 before a voltage is applied to the liquid crystal lens.

Next, FIG. 11 and FIG. 12 illustrate an arrangement of liquid crystal molecules immediately after an electric field is applied to the lens electrodes. Specifically, FIG. 11 and FIG. 12 illustrate the arrangement of the liquid crystal molecules 15 ms after the electric field is applied thereto.

Referring to FIG. 11 and FIG. 12, the liquid crystal molecules align in a direction due to the application of the electric field.

Specifically, the liquid crystal molecules form a spiral due the electric field generated between the adjacent lower lens electrodes 391 and an electric field generated between the lower lens electrodes 391 and the upper lens electrode 470.

As a result, although the liquid crystal molecules form a spiral, the arrangement of the liquid crystal molecules positioned around the spacer 350 also changes due to the influence of the surface of the spacer 350.

Referring to FIG. 12, liquid crystal molecules positioned at a region to the left of the spacer 350 are arranged so that heads of the liquid crystal molecules face the spacer 350.

However, at a region to the right of the spacer 350, most of the liquid crystal molecules are arranged so that their heads face a right side, but the liquid crystal molecules adjacent to the spacer 350 are arranged so that their heads face the spacer 350, i.e., a left side, due to the influence of the surface of the spacer 350.

As a result, the arrangement of the liquid crystal molecules is disturbed. However, according to an exemplary embodiment of the present disclosure, the opening 450 is formed in the upper lens electrode 470 on one side of the spacer 350. Since no upper lens electrode 470 is present where the opening 450 is formed, no electric field can be generated between the lower lens electrodes 391 and the upper lens electrode 470 in the region corresponding to the opening 450. As a result, the liquid crystal molecules of the region do not align in a direction, but are aligned as if no electric field is applied.

Referring to FIG. 12, the liquid crystal molecules positions at a second column on the left side of the spacer 350 are vertically arranged without being aligned in a direction. This is because, as described above, no upper lens electrode 470 is present where the opening 450 is formed, and thus no electric field can be generated between the upper substrate 410 and the lower substrate 310.

As such, the non-aligned liquid crystal molecules positioned corresponding to the opening serve as a buffer layer. Accordingly, the non-aligned liquid crystal molecules can block the alignment disturbance even though the alignment of the liquid crystal molecules positioned around the spacer 350 is disturbed.

Referring to FIG. 12, an arrangement of the liquid crystal molecules positioned at a first column adjacent to the right side of the space 350 is disturbed so that their heads face the spacer 350. However, as described above, the liquid crystal molecules positioned at a second column adjacent to the first column are vertically arranged since no electric field is generated due to the presence of the opening 450. The liquid crystal molecules positioned at a third column adjacent to the second column are arranged so that their heads face the right side, a direction originally desired using the electric field, while being unaffected by the alignment disturbance of the liquid crystal molecules positioned at the first column.

As a result, a region in which no electric field is generated is formed around the spacer, and liquid crystal molecules positioned in the region serve as a buffer layer that can block the alignment disturbance of the liquid crystal molecules, thereby preventing the generation of textures in the liquid crystal lens.

FIG. 13 and FIG. 14 illustrate an arrangement of liquid crystal molecules at a predetermined time after an electric field is applied to the lens electrodes. Specifically, FIG. 13 and FIG. 14 illustrate the arrangement of the liquid crystal molecules 30 ms after the electric field is applied thereto.

Referring to FIG. 13 and FIG. 14, the alignment of the liquid crystal molecules positioned around the spacer is maintained without being broken. However, according to a comparative embodiment of the present disclosure, the alignment of the liquid crystal molecules positioned around the spacer is broken, and the broken region widens over time.

However, as illustrated in FIG. 14, in a liquid crystal lens according to an exemplary embodiment of the present disclosure, as the opening 450 is formed, the liquid crystal molecules positioned in the region of the opening 450 are not affected by an electric field and thus arranged vertically, thereby serving as a buffer layer that can block the alignment disturbance of the liquid crystal molecules.

Figure 15A:
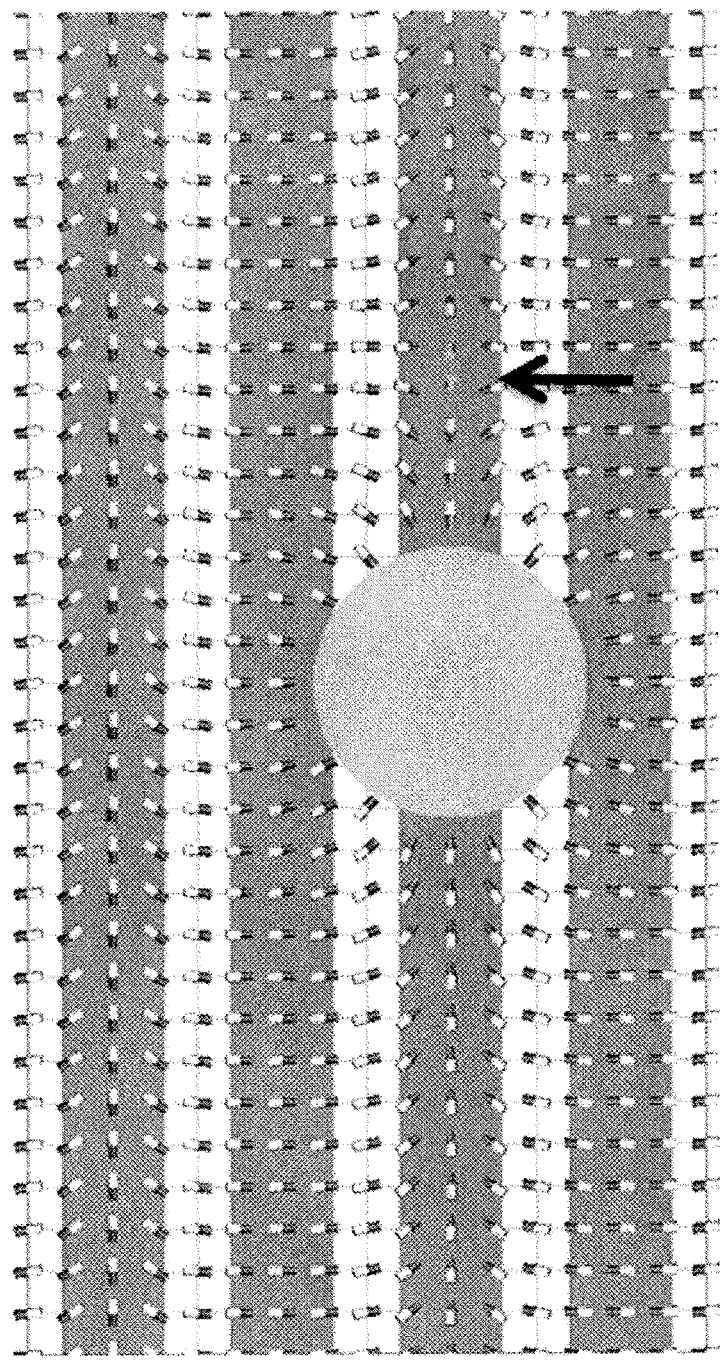
FIG. 15A to FIG. 15C illustrate liquid crystal lenses according to comparative examples and a test example of the present disclosure.
Figure 15B:
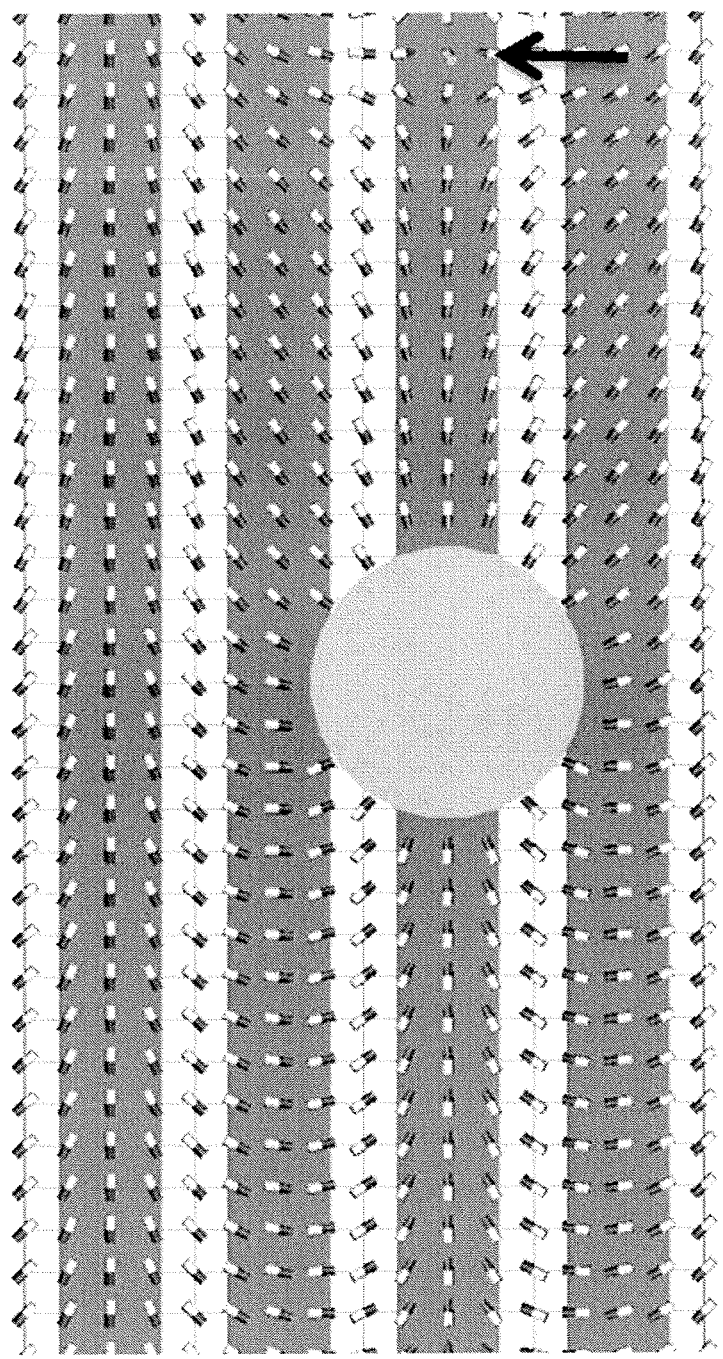
Figure 15C:
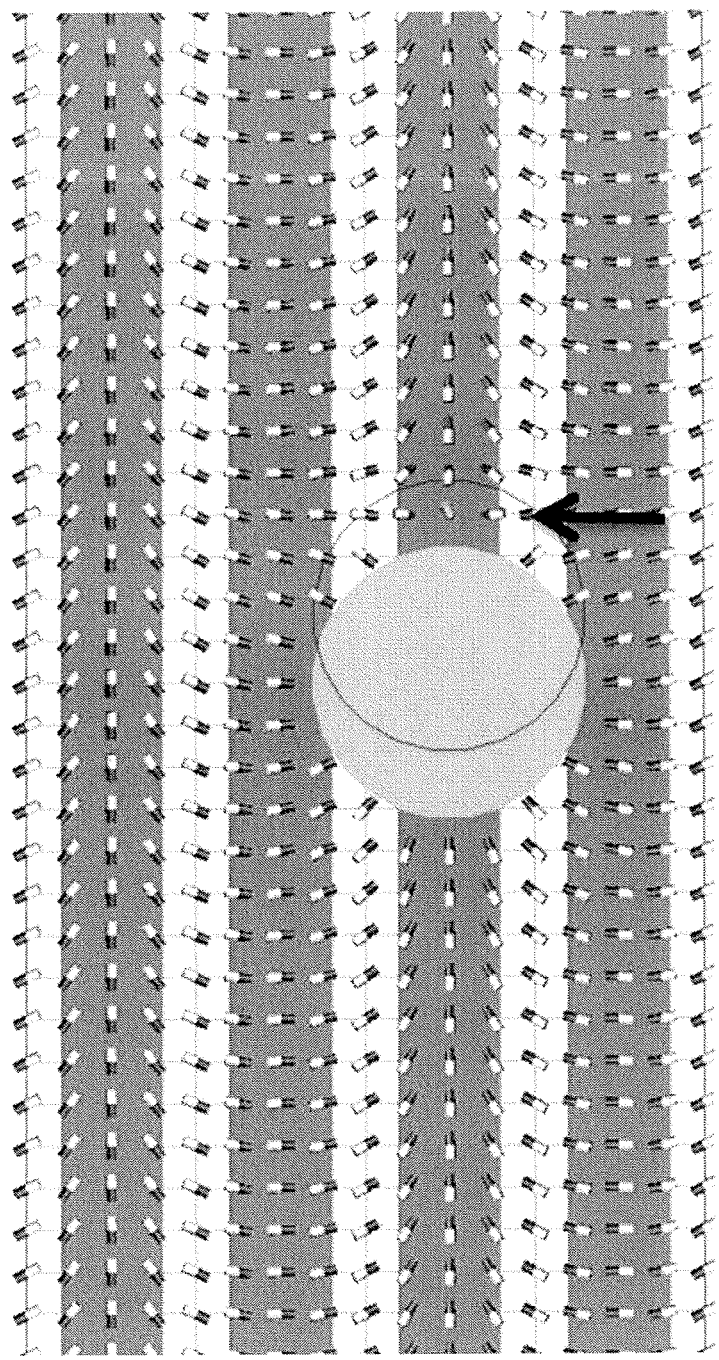

FIG. 15A to FIG. 15C illustrate this effect of a liquid crystal lens according to comparative examples and a test example of the present disclosure.

Specifically, FIG. 15A illustrates an arrangement of liquid crystal molecules in the liquid crystal lens 50 ms after a voltage is applied thereto according to a comparative example, FIG. 15B illustrates an arrangement of liquid crystal molecules in the liquid crystal lens 800 ms after a voltage is applied thereto according to a comparative example, and FIG. 15C illustrates an arrangement of liquid crystal molecules in the liquid crystal lens 800 ms after a voltage is applied thereto according to a test example.

Referring to FIG. 15A to FIG. 15C, no opening is formed around the region where the spacer is formed in a liquid crystal lens according to the comparative examples. However, an opening is formed around the region where the spacer is formed in a liquid crystal lens according to a test example.

Referring to FIG. 15A and FIG. 15B, the alignment disturbance of the liquid crystal molecules positioned around the region where the spacer is formed, indicated by an arrow in FIG. 15A, expands to an adjacent region as time passes, and this alignment disturbance occurs even in a region distant from the spacer, as illustrated by an arrow in FIG. 15B.

However, referring to FIG. 15C, an opening is formed around the region where the spacer is formed in the liquid crystal lens, and a buffer layer forms in the liquid crystal molecules near to this opening as described above. Accordingly, as illustrated in FIG. 15C, although a period of time has passed, the alignment disturbance of the liquid crystal molecules formed around the spacer has not expanded, and is fixed around the spacer. As a result, since the alignment disturbance of the liquid crystal molecules does not expand, it is possible to maintain the performance of a liquid crystal lens.

Figure 16:
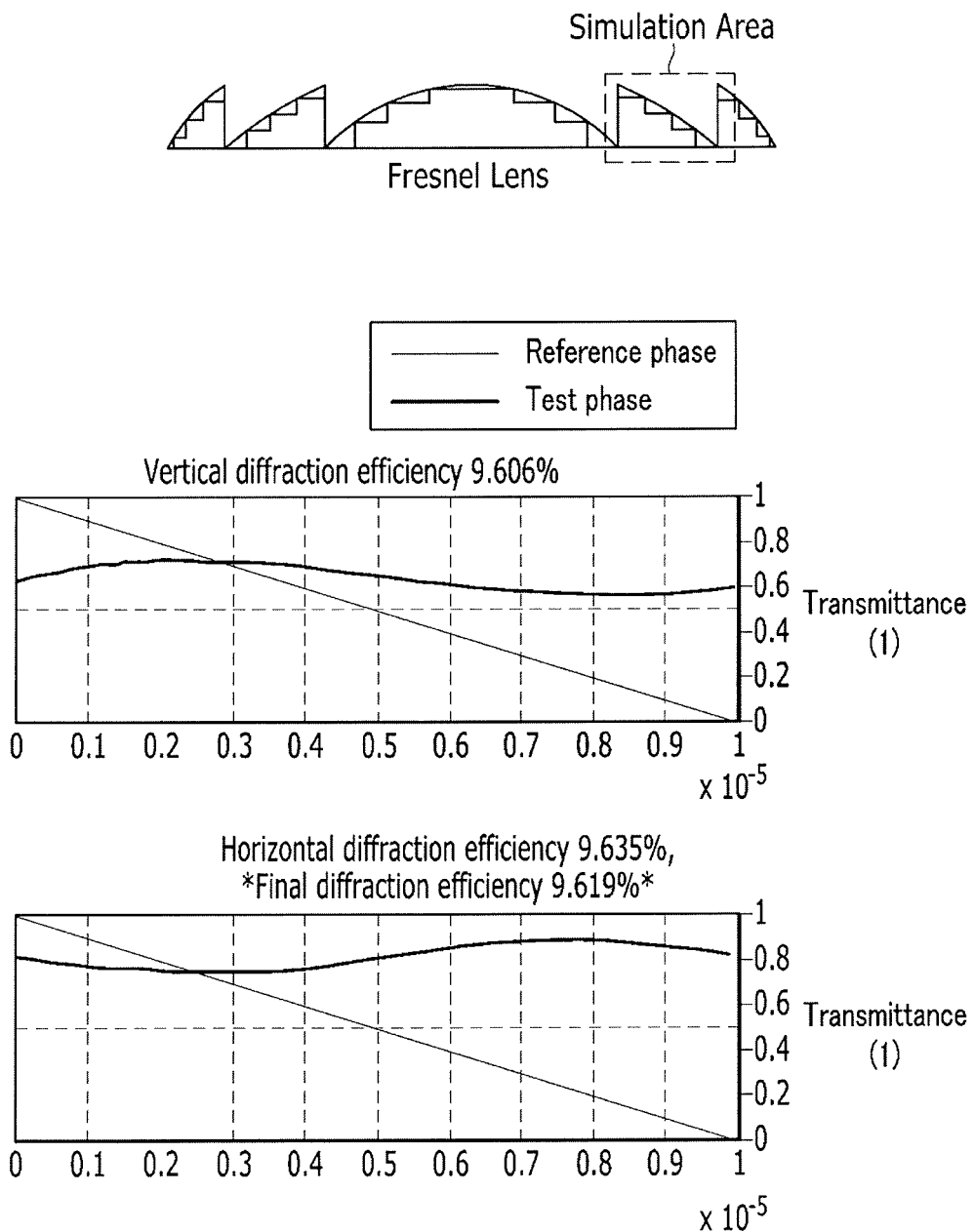
FIG. 16 illustrates a reference phase and a test phase of a liquid crystal lens according to a comparative embodiment of the present disclosure.
Figure 17:
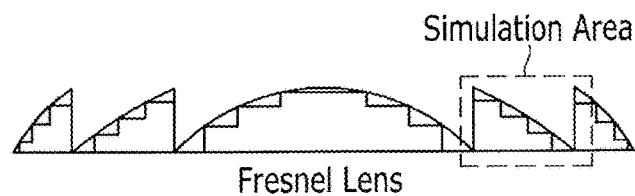
FIG. 17 illustrates a reference phase and a test phase of a liquid crystal lens according to an exemplary embodiment of the present disclosure.
Figure 17:
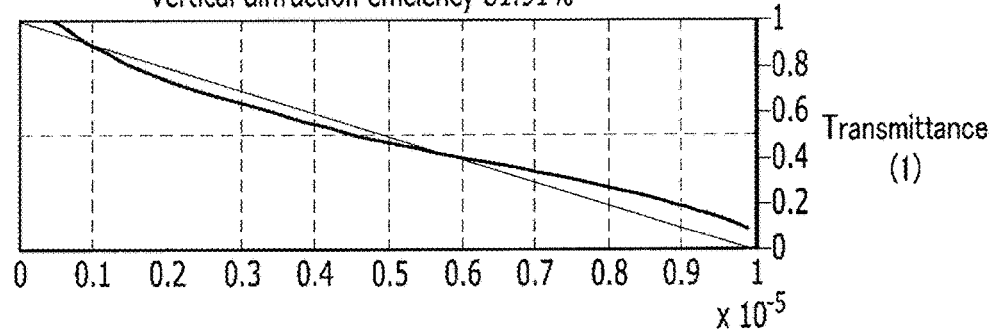
Figure 17:
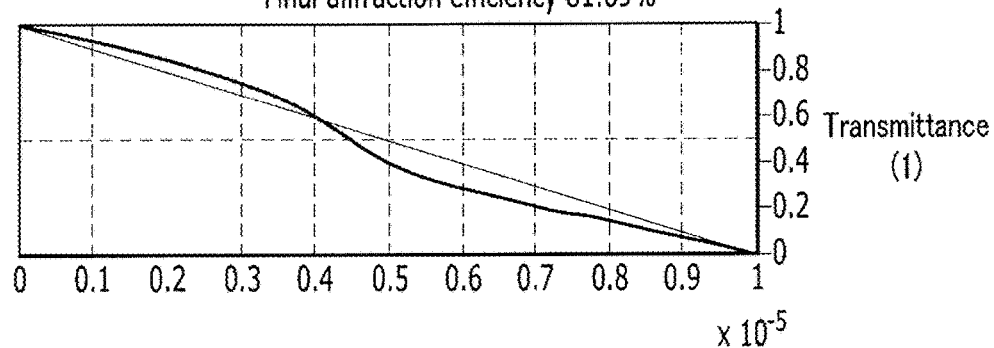

FIG. 16 illustrates a reference phase and a test phase of a liquid crystal lens according to a comparative embodiment of the present disclosure. FIG. 17 illustrates a reference phase and a test phase of a liquid crystal lens according to an exemplary embodiment of the present disclosure.

Referring to FIG. 16, a test phase and a reference phase used as a Fresnel liquid crystal lens are compared for a simulation area of a liquid crystal. As a result, as shown in FIG. 16, the arrangement of liquid crystal molecules is disturbed by the spacer according to a comparative embodiment of the present disclosure, and thus the reference phase that serves as the Fresnel liquid crystal lens differs significantly from the test phase obtained when the liquid crystal lens is actually driven.

However, referring to FIG. 17, as described above, the alignment disturbance of the liquid crystal molecules is prevented from expanding due to an opening formed in the upper lens electrode around the spacer in a liquid crystal lens according to an exemplary embodiment of the present disclosure. Accordingly, as shown in FIG. 17, the reference phase is substantially the same as the test phase. Specifically, the reference phase that serves as the Fresnel lens is substantially the same as the test phase obtained when the liquid crystal lens is actually driven in a liquid crystal lens according to an exemplary embodiment of the present disclosure, and thus a liquid crystal lens according to a present exemplary embodiment has improved lens performance.

In other words, a liquid crystal lens according to a present exemplary embodiment can maintain the performance of a liquid crystal Fresnel lens regardless of the spacer. According to a comparative embodiment of the present disclosure, the position and number of the spacers are limited due to textures generated by the alignment disturbance of the liquid crystal molecules.

However, a liquid crystal lens according to a present exemplary embodiment can eliminate texture generated by the spacer by an opening formed around the spacer, which allows the position and number of the spacers to be freely adjusted.

Accordingly, the number of spacers can be increased, and thus it is possible to manufacture a larger-area panel as compared to a comparative embodiment. Further, it is possible to maintain lens performance without texture while using a liquid crystal lens with a large-area panel.

As such, in a display device according to an exemplary embodiment of the present disclosure, a liquid crystal lens is disposed on a display panel, and a 2D image or a 3D image can be displayed according to an on/off state of the liquid crystal lens. Further, in an upper lens electrode of the liquid crystal lens, an alignment disturbance of the liquid crystal molecules can be suppressed by an opening formed around the spacer to maintain lens performance.

While embodiments of this disclosure have been described in connection with what is presently considered to be practical exemplary embodiments, it is to be understood that embodiments of the disclosure are not limited to the disclosed embodiments but, on the contrary, are intended to cover various modifications and equivalent arrangements included within the spirit and scope of the appended claims.

What is claimed is:

1. A display device comprising:
a liquid crystal lens panel,
wherein the liquid crystal lens panel includes
a lower substrate,
an upper substrate that faces the lower substrate,
a lower lens electrode disposed on the lower substrate,
an upper lens electrode disposed on the upper substrate, and
a liquid crystal layer and a columnar spacer disposed between the lower substrate and the upper substrate, and
an opening formed in a portion of the upper lens electrode which corresponds to the spacer, wherein the opening of the upper lens electrode and the spacer partially overlap,
wherein the spacer has a region that does not overlap the opening of the upper lens.

2. The display device of claim 1, wherein the opening has a circular shape.

3. The display device of claim 1, wherein no electric field is generated in a region of the liquid crystal layer that corresponds to the opening, when voltages are applied to the lower lens electrode and the upper lens electrode.

4. The display device of claim 1, wherein the liquid crystal lens panel includes a plurality of spacers and openings disposed therein.

5. The display device of claim 1, wherein the lower lens electrode includes a plurality of branch electrodes that form a stripe pattern, and the upper lens electrode has a plate shape.

6. The display device of claim 5, wherein widths of the branch electrodes are the same.

7. The display device of claim 5, wherein widths of the branch electrodes are different.

8. The display device of claim 7, wherein a width of the branch electrodes increases toward a center of liquid crystal lens panel.

9. The display device of claim 1, further comprising a display panel configured to display an image, wherein the display panel is one of a liquid crystal display (LCD) panel, an electrophoretic display panel (EDP), an organic light emitting display (OLED) panel, or a plasma display panel (PDP).

10. The display device of claim 1, wherein the liquid crystal lens panel is configured to operate in a 2-dimensional (2D) display mode or a 3-dimensional (3D) display mode, the liquid crystal lens panel applies no voltage to the upper lens electrode and the lower lens electrode in 2D display mode, and
the liquid crystal lens applies different voltages to a plurality of branches of the lower lens electrode and a predetermined common voltage to the upper lens electrode in 3D display mode.

11. A display device comprising:
a liquid crystal lens panel,
wherein the liquid crystal lens panel includes
a lower substrate,
an upper substrate that faces the lower substrate,
a lower lens electrode disposed on the lower substrate,
an upper lens electrode disposed on the upper substrate, and
a liquid crystal layer and a columnar spacer disposed between the lower substrate and the upper substrate, and
an opening formed in a portion of the upper lens electrode which corresponds to the spacer,
wherein no electric field is generated in a region of the liquid crystal layer that corresponds to the opening, when voltages are applied to the lower lens electrode and the upper lens electrode,
wherein the spar has a region that does not overlap the opening of the upper lens.

12. The display device of claim 11, wherein the opening has a circular shape.

13. The display device of claim 11, wherein the liquid crystal lens panel forms a Fresnel lens due to application of voltages to the lower lens electrode and the upper lens electrode.

14. The display device of claim 11, wherein the liquid crystal lens panel includes a plurality of spacers and openings disposed therein.

15. The display device of claim 14, wherein a width of the branch electrodes increases toward a center of liquid crystal lens panel.

16. The display device of claim 11, wherein the lower lens electrode includes a plurality of branch electrodes that form a stripe pattern, and the upper lens electrode has a plate shape.

17. The display device of claim 16, wherein widths of the branch electrodes are the same.

18. The display device of claim 11, further comprising a display panel configured to display an image, wherein the display panel is one of a liquid crystal display (LCD) panel, an electrophoretic display panel (EDP), an organic light emitting display (OLED) panel, or a plasma display panel (PDP).

19. The display device of claim 11, wherein the liquid crystal lens panel is configured to operate in a 2-dimensional (2D) display mode or a 3-dimensional (3D) display mode, the liquid crystal lens panel applies no voltage to the upper lens electrode and the lower lens electrode in 2D display mode, and
the liquid crystal lens applies different voltages to a plurality of branches of the lower lens electrode and a predetermined common voltage to the upper lens electrode in 3D display mode.

* * * * *